United States Patent
Sato et al.

(10) Patent No.: US 10,403,438 B2
(45) Date of Patent: Sep. 3, 2019

(54) MULTILAYER CERAMIC CAPACITOR

(71) Applicant: TAIYO YUDEN CO., LTD., Chuo-ku, Tokyo (JP)

(72) Inventors: So Sato, Takasaki (JP); Yoshiaki Iijima, Takasaki (JP); Takashi Sasaki, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/653,235

(22) Filed: Jul. 18, 2017

(65) Prior Publication Data

US 2018/0025845 A1 Jan. 25, 2018

(30) Foreign Application Priority Data

Jul. 25, 2016 (JP) ................................. 2016-145123

(51) Int. Cl.
| | |
|---|---|
| *H01G 4/30* | (2006.01) |
| *H01G 4/232* | (2006.01) |
| *H01G 2/12* | (2006.01) |
| *H01G 4/12* | (2006.01) |
| *H01G 2/10* | (2006.01) |
| *H01G 4/008* | (2006.01) |
| *H01G 4/224* | (2006.01) |

(52) U.S. Cl.
CPC ............ *H01G 4/306* (2013.01); *H01G 2/103* (2013.01); *H01G 2/12* (2013.01); *H01G 4/008* (2013.01); *H01G 4/1209* (2013.01); *H01G 4/224* (2013.01); *H01G 4/232* (2013.01)

(58) Field of Classification Search
CPC .......... H01G 4/30; H01G 4/228; H01G 4/232
USPC ...................................... 361/306.3
See application file for complete search history.

(56) References Cited

U.S. PATENT DOCUMENTS

| | | | |
|---|---|---|---|
| 6,903,919 B2* | 6/2005 | Kayatani ............... | H01G 2/103 29/25.41 |
| 2010/0290172 A1* | 11/2010 | Motoki ................. | H01G 4/232 361/305 |
| 2011/0002082 A1* | 1/2011 | Bultitude ............... | H01G 4/005 361/306.3 |
| 2013/0250480 A1* | 9/2013 | Ahn ...................... | H01G 4/129 361/321.2 |
| 2015/0084481 A1* | 3/2015 | Mori ..................... | H01C 1/148 310/311 |

(Continued)

FOREIGN PATENT DOCUMENTS

JP   S61025234 U   2/1986

*Primary Examiner* — Eric W Thomas
(74) *Attorney, Agent, or Firm* — Law Office of Katsuhiro Arai

(57) ABSTRACT

In an embodiment, a multilayer ceramic capacitor 10 has supplementary dielectric layers 11*d* covering the spaces between two first base conductor films 11*c* on both height-direction faces of a capacitive element 11', respectively, in such a way that clearances CL are left between the first base conductor films 11*c* and the supplementary dielectric layers 11*d* in the length direction. External electrodes 12, 13 each have a second base conductor film 12*a*, 13*a* and a surface conductor film 12*b*, 13*b*, and the wraparound locations 12*b*1, 13*b*1 of each surface conductor film 12*b*, 13*b* have insertion parts 12*b*2, 13*b*2 that fill in the clearances CL. The multilayer ceramic capacitor can mitigate deterioration in moisture resistance.

19 Claims, 5 Drawing Sheets

(56) References Cited

U.S. PATENT DOCUMENTS

2016/0024346 A1\* 1/2016 Inoue .................. C09D 163/00
   361/301.4
2017/0018361 A1\* 1/2017 Nishisaka ................ H01G 4/30

\* cited by examiner

FIG. 9
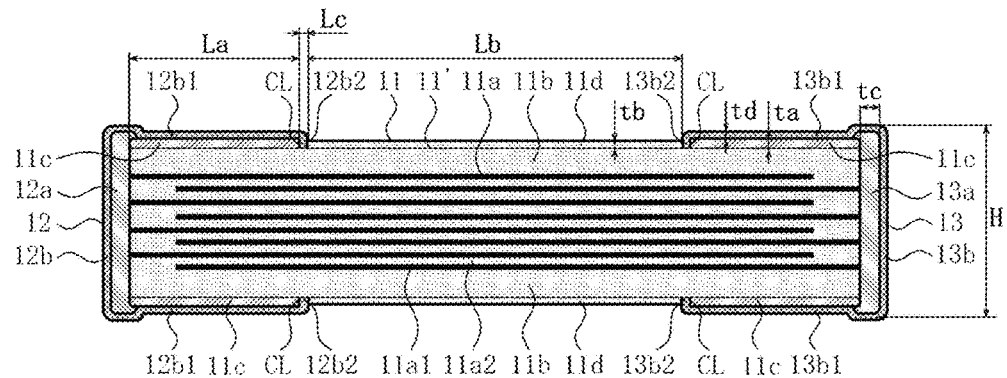
FIG. 10
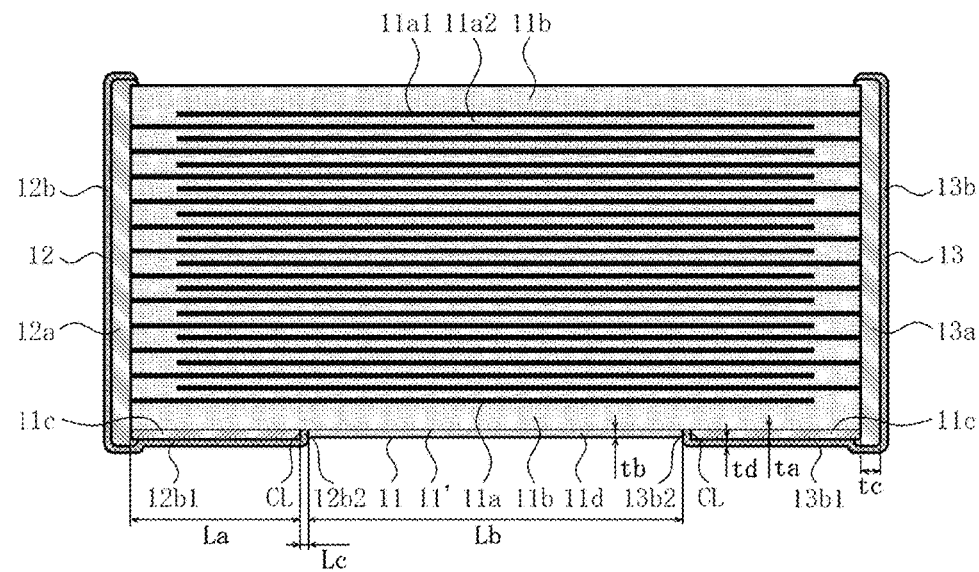
FIG. 11
<<First Prototype>>
| La (μm) | Lc (μm) | Moisture resistance test |
|---|---|---|
| 150 | 1.0 | 0/100 |
| 150 | 2.0 | 0/100 |
| 150 | 3.0 | 0/100 |
| 150 | 4.0 | 0/100 |
| 150 | 5.0 | 0/100 |
| 150 | 6.0 | 2/100 |
| 150 | 7.0 | 4/100 |
<<Second Prototype>>
| La (μm) | Lc (μm) | Moisture resistance test |
|---|---|---|
| 250 | 1.0 | 0/100 |
| 250 | 2.0 | 0/100 |
| 250 | 3.0 | 0/100 |
| 250 | 4.0 | 0/100 |
| 250 | 5.0 | 0/100 |
| 250 | 6.0 | 1/100 |
| 250 | 7.0 | 4/100 |

MULTILAYER CERAMIC CAPACITOR

BACKGROUND

Field of the Invention

The present invention relates to a multilayer ceramic capacitor whose external electrodes each have wraparound parts that wrap around onto at least one height-direction face of the capacitor body.

Description of the Related Art

The size of a multilayer ceramic capacitor is specified by its length, width, and height, of which "height" refers to the dimension along the stacking direction of internal electrode layers. Also, a multilayer ceramic capacitor generally comprises a capacitor body of roughly rectangular solid shape having a capacitive part constituted by multiple internal electrode layers that are stacked together with dielectric layers in between, as well as a pair of external electrodes which are provided on both ends of the capacitor body in the length direction and to which the multiple internal electrode layers are connected alternately, wherein each external electrode has wraparound parts that wrap around onto at least one height-direction face of the capacitor body.

Incidentally, the market continues to demand multilayer ceramic capacitors of smaller sizes while demanding capacitance increase at the same time; however, reducing the size of a multilayer ceramic capacitor, or particularly its height, presents a concern that the strength of the capacitor body may drop.

If each external electrode has wraparound parts that wrap around onto at least one height-direction face of the capacitor body, which is the case with the aforementioned multilayer ceramic capacitor, one possible method for suppressing the aforementioned drop in strength is to use dielectric layers to cover the spaces between the wraparound parts on at least one height-direction face of the capacitor body (refer to Patent Literature 1, for example). According to this method, the drop in the strength of the capacitor body can be suppressed by the dielectric layers.

However, assignment of dimensional tolerances is an unavoidable step in producing the dielectric layers, which means that, even when the design ensures as little clearance as possible between the wraparound parts of the external electrodes and the dielectric layers, the reality is that clearances still open between the wraparound parts of the external electrodes and the dielectric layers on some manufactured capacitors, while no such clearances exist on others.

In other words, on those capacitors having clearances between the wraparound parts of the external electrodes and the dielectric layers, the effective height of the capacitor body varies between parts where there is a clearance and parts where there is no clearance, and water can enter the capacitor body easily through the parts where there is a clearance, and this gives rise to another concern that moisture resistance of the capacitor body may drop.

BACKGROUND ART LITERATURES

[Patent Literature 1] Japanese Utility Model Laid-open No. Sho 61-025234

SUMMARY

A problem to be solved by the present invention is to provide a multilayer ceramic capacitor that, even when the capacitor body has dielectric layers covering the spaces between the wraparound parts of the external electrodes on at least one height-direction face thereof, mitigates the concern that moisture resistance may drop due to clearances between the wraparound parts of the external electrodes and the dielectric layers.

Any discussion of problems and solutions involved in the related art has been included in this disclosure solely for the purposes of providing a context for the present invention, and should not be taken as an admission that any or all of the discussion were known at the time the invention was made.

To solve the aforementioned problem, a multilayer ceramic capacitor pertaining to the present invention is a multilayer ceramic capacitor comprising a capacitor body of roughly rectangular solid shape, as well as a pair of external electrodes provided on both ends of the capacitor body in the length direction, where the external electrodes each have wraparound parts that wrap around onto at least one height-direction face of the capacitor body, wherein: the capacitor body has: (a1) a capacitive element of roughly rectangular solid shape; (a2) first base conductor films provided on both length-direction ends of at least one height-direction face of the capacitive element; and (a3) a supplementary dielectric layer covering the space between the first base conductor films on the at least one height-direction face of the capacitive element except that there is a clearance between each of the first base conductor films and the supplementary dielectric layer in the length direction; one of the external electrodes has: (b1) a second base conductor film attached to one length-direction face of the capacitive element and also to one length-direction edge of the first base conductor film present on the one length-direction side of the capacitor body; and (b2) a surface conductor film attached continuously to the surface of the second base conductor film and also to the surface of the first base conductor film, wherein the wraparound part is constituted by the first base conductor film and the surface conductor film attached to the first base conductor film at the wraparound location, and the surface conductor film has, at the wraparound location, an insertion part that fills in the clearance; and the other of the external electrodes has: (c1) a second base conductor film attached to the other length-direction face of the capacitive element and also to the other length-direction edge of the first base conductor film present on the other length-direction side of the capacitor body; and (c2) a surface conductor film attached continuously to the surface of the second base conductor film and also to the surface of the first base conductor film, wherein the wraparound part is constituted by the first base conductor film and the surface conductor film attached to the first base conductor film at the wraparound location, and the surface conductor film has, at the wraparound location, an insertion part that fills in the clearance.

According to a multilayer ceramic capacitor pertaining to the present invention, the concern that moisture resistance may drop due to clearances between the wraparound parts of the external electrodes and the dielectric layers, can be mitigated, even when the capacitor body has dielectric layers covering the spaces between the wraparound parts of the external electrodes on at least one height-direction face thereof.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention.

Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 6A is a drawing corresponding to FIG. 3, while FIG. 6B is a drawing corresponding to FIG. 1.

FIG. 9 is a drawing corresponding to FIG. 3, illustrating another multilayer ceramic capacitor to which the present invention is applied.

FIG. 10 is a drawing corresponding to FIG. 3, illustrating another multilayer ceramic capacitor to which the present invention is applied.

FIG. 11 is drawing set of tables showing the verification results of the effects obtained by embodiments of the present invention.

DESCRIPTION OF THE SYMBOLS

10 - - - Multilayer ceramic capacitor, 11 - - - Capacitor body, 11' - - - Capacitive element, 11a - - - Capacitive part, 11a1 - - - Internal electrode layer, 11a2 - - - Dielectric layer, 11b - - - Dielectric margin part, 11c - - - First base conductor film, 11d - - - Supplementary dielectric layer, CL - - - Clearance, 12 - - - First external electrode, 12a - - - Second base conductor film, 12b - - - Surface conductor film, 12b1 - - - Wraparound location of the surface conductor film, 12b2 - - - Insertion part in the wraparound location, 12c - - - Wraparound part, 13 - - - Second external electrode, 13a - - - Second base conductor film, 13b - - - Surface conductor film, 13b1 - - - Wraparound location of the surface conductor film, 13b2 - - - Insertion part in the wraparound location, 13c - - - Wraparound part.

DETAILED DESCRIPTION OF EMBODIMENTS

Figure 1:
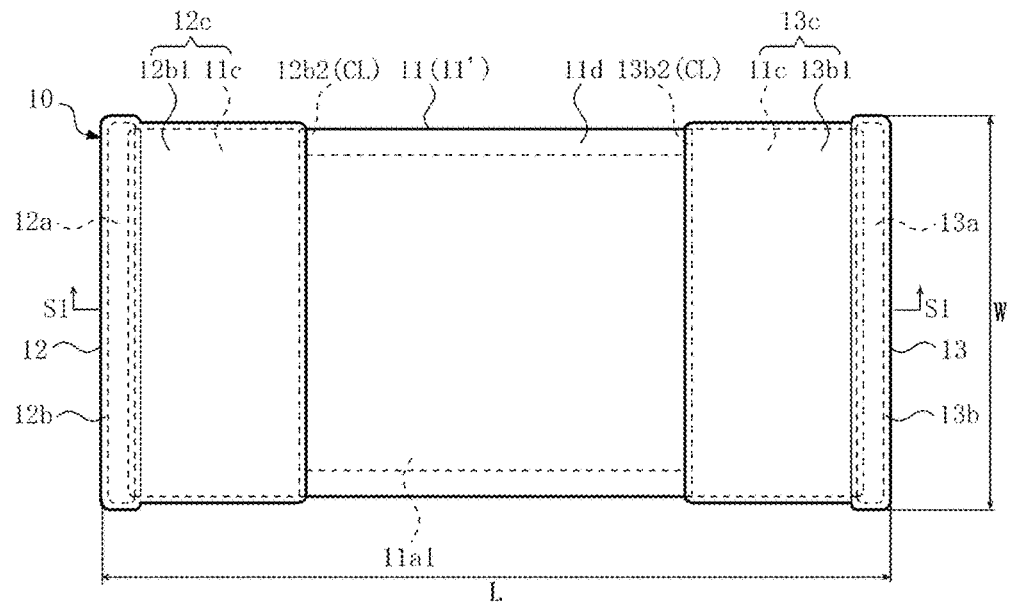
FIG. 1 is a view of a multilayer ceramic capacitor to which the present invention is applied, from the one height-direction face side thereof.
Figure 2:
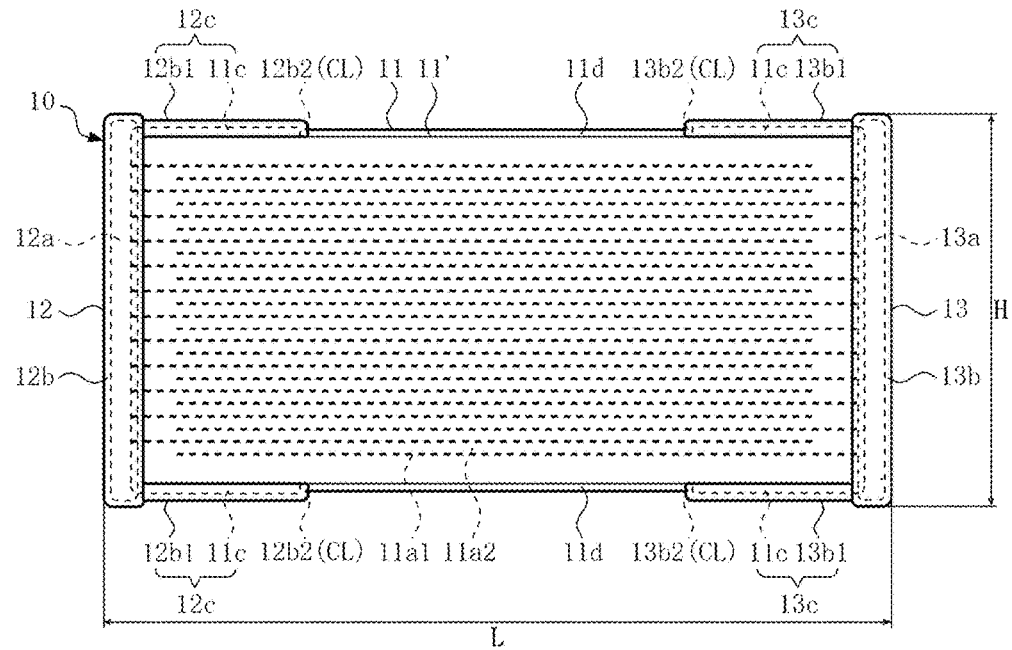
FIG. 2 is a view of the multilayer ceramic capacitor shown in FIG. 1, from the one width-direction face side thereof.
Figure 3:
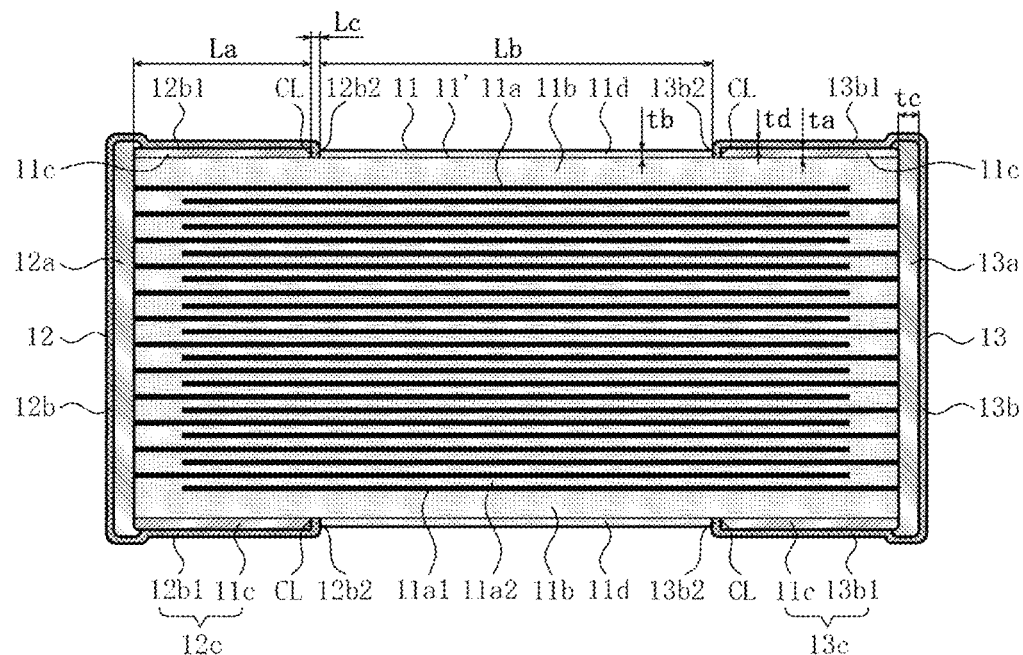
FIG. 3 is a cross-sectional view of the multilayer ceramic capacitor shown in FIG. 1, along line S1-S1.

First, the structure of a multilayer ceramic capacitor 10 to which the present invention is applied, is explained using FIGS. 1 to 4B. In the following explanation, the lateral direction of FIG. 1 is referred to as the length direction, the vertical direction of FIG. 1 is referred to as the width direction, and the vertical direction of FIG. 2 is referred to as the height direction, while the dimensions along these length, width, and height directions are referred to as the length, width, and height, respectively.

The size of the multilayer ceramic capacitor 10 shown in FIGS. 1 to 4B is specified by its length L, width W, and height H. For reference, the actual dimensions of the length L, width W, and height H of the first prototype on which FIGS. 1 to 4B are based are 600 μm, 300 μm, and 300 μm, respectively, while the actual dimensions of the length L, width W, and height H of the second prototype are 1000 μm, 500 μm and 500 μm, respectively, and in both cases the dimensions have the relationship of "Length L>Width W=Height H." This multilayer ceramic capacitor 10 has a capacitor body 11 of roughly rectangular solid shape, a first external electrode 12 provided on one length-direction end of the capacitor body 11, and a second external electrode 13 provided on the other length-direction end of the capacitor body 11.

The capacitor body 11 has: (a1) a capacitive element 11' of roughly rectangular solid shape, having a capacitive part 11a constituted by multiple internal electrode layers 11a1 that are stacked together with dielectric layers 11a2 in between, as well as dielectric margin parts 11b provided on both height-direction sides of the capacitive part 11a; (a2) first base conductor films 11c (total four films) provided on both length-direction ends of both height-direction faces of the capacitive element 11', respectively; and (a3) supplementary dielectric layers 11d (total two layers) covering the spaces between the two first base conductor films 11c on both height-direction faces of the capacitive element 11', respectively, in such a way that clearances CL are left between the first base conductor films 11c and the supplementary dielectric layers 11d in the length direction. It should be noted that, while FIGS. 2 and 3 describe a total of 24 internal electrode layers 11a1 for the convenience of illustration, the number of internal electrode layers 11a1 is not limited in any way.

Each internal electrode layer 11a1 has roughly the same external shape (roughly rectangular) and roughly the same thickness. The length (not accompanied by symbol) of each internal electrode layer 11a1 is smaller than the length (not accompanied by symbol) of the capacitive element 11', and the width (not accompanied by symbol) of each internal electrode layer 11a1 is smaller than the width (not accompanied by symbol) of the capacitive element 11'. The thickness of each internal electrode layer 11a1 is set in a range of 0.5 to 3 μm, for example.

Each dielectric layer 11a2 has roughly the same external shape (roughly rectangular) and roughly the same thickness. The length (not accompanied by symbol) of each dielectric layer 11a2 is roughly the same as the length of the capacitive element 11', and the width (not accompanied by symbol) of each dielectric layer 11a2 is roughly the same as the width of the capacitive element 11'. The thickness of each dielectric layer 11a2 is set in a range of 0.5 to 3 μm, for example.

Each dielectric margin part 11b has roughly the same external shape (roughly rectangular) and roughly the same thickness. The length (not accompanied by symbol) of each dielectric margin part 11b is roughly the same as the length of the capacitive element 11', and the width (not accompanied by symbol) of each dielectric margin part 11b is roughly the same as the width of the capacitive element 11'. The thickness of each dielectric margin part 11b is set in a range of 5 to 30 μm, for example.

The primary component of each internal electrode layer 11a1 is nickel, copper, palladium, platinum, silver, gold, alloy thereof, or other metal material, for example. The primary component of each dielectric layer 11a2 and primary component of each dielectric margin part 11b are both, or specifically the primary component of the capacitive element 11' excluding the internal electrode layers 11a1 is, barium titanate, strontium titanate, calcium titanate, magnesium titanate, calcium zirconate, calcium zirconate titanate, barium zirconate, titanium oxide, or other dielectric material (dielectric ceramic material), for example.

Each first base conductor film 11c has roughly the same external shape (roughly rectangular) and roughly the same thickness. The length La of each first base conductor film 11c is set in a range of one-sixth to three-sevenths the length L of the multilayer ceramic capacitor 10, for example, and the width (not accompanied by symbol) of each first base conductor film 11c is roughly the same as the width of the capacitive element 11'. The thickness ta of each first base conductor film 11c is set in a range of 2 to 6 μm, for example.

The primary component of each first base conductor film 11c is nickel, copper, palladium, platinum, silver, gold, alloy thereof, or other metal material, for example, and is preferably the same as the primary component of the internal electrode layers 11a1.

Each supplementary dielectric layer 11d has roughly the same external shape (roughly rectangular) and roughly the same thickness. The length Lb of each supplementary dielectric layer 11d is smaller than the length-direction spacing (corresponding to Lb+2Lc) between the two first base conductor films 11c on each of both height-direction faces of the capacitive element 11', and the width (not accompanied by symbol) of each supplementary dielectric layer 11d is roughly the same as the width of the capacitive element 11'. The thickness tb of each supplementary dielectric layer 11d is set in a range of 2 to 6 μm, for example, and is preferably the same as the thickness ta of the first base conductor film 11c. Also, the thickness tb of each supplementary dielectric layer 11d is equal to or less than the sum of the thickness ta of the first base conductor film 11c and the thickness td of the wraparound location 12b1, 13b1 of the surface conductor film 12b, 13b as described later, or specifically the thickness of the wraparound part 12c, 13c as described later.

The primary component of each supplementary dielectric layer 11d is barium titanate, strontium titanate, calcium titanate, magnesium titanate, calcium zirconate, calcium zirconate titanate, barium zirconate, titanium oxide, or other dielectric material (dielectric ceramic material), for example, and is preferably the same as the primary component of the capacitive element 11' excluding the internal electrode layers 11a1.

The length Lc of each clearance CL is set in a range of 2 to 6 μm, for example, while the width (not accompanied by symbol) of each clearance CL is roughly the same as the width of the capacitive element 11'.

The first external electrode 12 has: (b1) a second base conductor film 12a attached to one length-direction face (left face in FIG. 3) of the capacitive element 11' and also to one length-direction edges (left edges in FIG. 3) of the two first base conductor films 11c present on one length-direction side (left side in FIG. 3) of the capacitor body 11; and (b2) a surface conductor film 12b attached continuously to the surface of the second base conductor film 12a and also to the surfaces of the two first base conductor films 11c. In other words, the first external electrode 12 has two wraparound parts 12c that wrap around onto both height-direction faces of the capacitor body 11, each constituted by each first base conductor film 11c and the wraparound location 12b1 of the surface conductor film 12b attached to each first base conductor film 11c. Also, each wraparound location 12b1 of the surface conductor film 12b has insertion parts 12b2 that fill in the two clearances CL present on one length-direction side (left side in FIG. 3) of the capacitor body 11, respectively.

The second external electrode 13 has: (c1) a second base conductor film 13a attached to the other length-direction face (right face in FIG. 3) of the capacitive element 11' and also to the other length-direction edges (right edges in FIG. 3) of the two first base conductor films 11c present on the other length-direction side (right side in FIG. 3) of the capacitor body 11; and (c2) a surface conductor film 13b attached continuously to the surface of the second base conductor film 13a and also to the surfaces of the two first base conductor films 11c. In other words, the second external electrode 13 has two wraparound parts 13c that wrap around onto both height-direction faces of the capacitor body 11, each constituted by each first base conductor film 11c and the wraparound location 13b1 of the surface conductor film 13b attached to each first base conductor film 11c. Also, each wraparound location 13b1 of the surface conductor film 13b has insertion parts 13b2 that fill in the two clearances CL present on the other length-direction side (right side in FIG. 3) of the capacitor body 11, respectively.

In other words, the external electrodes 12, 13 each have two wraparound parts 12c, 13c that wrap around onto both height-direction faces of the capacitor body 11. As is evident from FIG. 3, the edges of the multiple internal electrode layers 11a1 described earlier are connected alternately to the second base conductor film 12a of the first external electrode 12 and the second base conductor film 13a of the second external electrode 13. While the second base conductor films 12a, 13a of the external electrodes 12, 13 depicted in FIGS. 1 to 3 have both of their height-direction edges slightly overlapping the first base conductor films 11c, these overlapping parts may not be necessary or the overlapping parts may be slightly longer than as illustrated.

The thickness tc of the second base conductor film 12a, 13a of each external electrode 12, 13 is set in a range of 5 to 15 μm, for example. The thickness td of the surface conductor film 12b, 13b of each external electrode 12, 13 is set in a range of 2 to 6 μm, for example. Also, the length (not accompanied by symbol) of the wraparound location 12b1, 13b1 of the surface conductor film 12b, 13b of each external electrode 12, 13 is roughly the same as {Length La of the first base conductor film 11c+Length Lc of the clearance CL}.

The primary component of the second base conductor film 12a, 13a of each external electrode 12, 13 is nickel, copper, palladium, platinum, silver, gold, alloy thereof, or other metal material, for example. Also, the primary component of the surface conductor film 12b, 13b of each external electrode 12, 13 is copper, nickel, tin, palladium, gold, zinc, alloy thereof, or other metal material, for example.

Figure 4A:
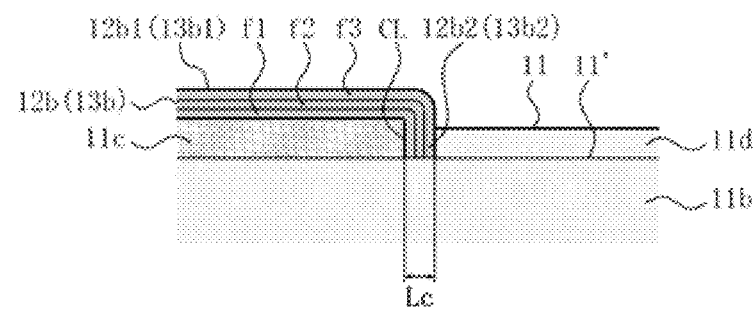
FIG. 4A and FIG. 4B are each an enlarged view showing key parts of FIG. 3.
Figure 4B:
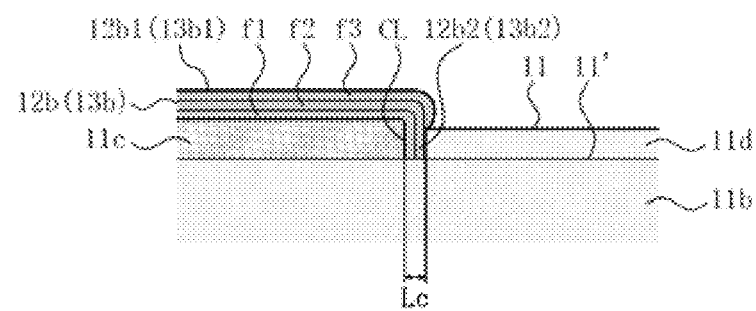
Figure 5:
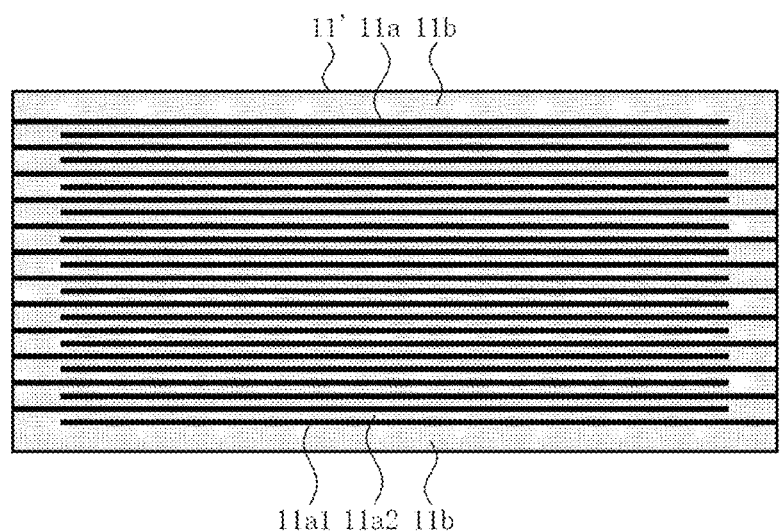
FIG. 5 is a drawing corresponding to FIG. 3, provided to explain an example of how the multilayer ceramic capacitor shown in FIG. 1 is manufactured.

Now, the layer structure of the surface conductor film 12b, 13b of each external electrode 12, 13, and the mode of the insertion part 12b2, 13b2 of each surface conductor film 12b, 13b, are described in detail using FIGS. 4A and 4B.

The surface conductor film 12b, 13b shown in FIGS. 4A and 4B has a three-layer structure, constituted by a first film f1, a second film f2, and a third film f3, which have been produced in this order. The primary component of each film f1, f2, f3 can be selected as deemed appropriate from among the metal materials mentioned above; however, in a specific example where the primary component of each internal electrode layer 11a1, primary component of each first base conductor film 11c, and primary component of each second base conductor film 12a, 13a are all nickel, the primary component of the first film f1 is copper, the primary component of the second film f2 is nickel, and the primary component of the third film f3 is tin. In addition, preferably each film f1, f2, f3 is a plating film, and any known wet plating method or dry plating method can be used to produce each film as deemed appropriate.

FIG. 4A shows a mode where the apical ends of all of the first film f1, second film f2, and third film f3 enter the clearance CL, and this mode tends to manifest when the length Lc of the clearance CL is roughly the same as the total sum of the respective thicknesses of the first film f1, second film f2, and third film f3. Also, FIG. 4B shows a mode where the apical ends of the first film f1 and second film f2 enter the clearance CL, but the apical end of the third film f3 does not enter the clearance CL, and this mode tends to manifest when the length Lc of the clearance CL is roughly the same as the total sum of the respective thicknesses of the first film f1 and second film f2. Neither mode is superior or inferior to the other mode, because the fact remains that the insertion part 12b2, 13b2 of the surface conductor film 12b, 13b fills in each clearance CL. So that the surface conductor film 12b, 13b will have an insertion part 12b2, 13b2 which fills in each clearance CL, ideally the thickness td of the surface conductor film 12b, 13b and the length Lc of each clearance CL have the relationship of "Thickness td≥Length Lc."

Also, while the surface conductor film 12b, 13b shown in FIGS. 4A and 4B has a three-layer structure, the layer structure of the surface conductor film 12b, 13b may be one comprising four layers each having a different primary component, two layers each having a different primary component, or any other number of layers, but needless to say it may also be a single-layer structure. For instance, if the primary component of each internal electrode layer 11a1, primary component of each first base conductor film 11c, and primary component of each second base conductor film 12a, 13a are all nickel, then a combination of a film whose primary component is nickel and a film whose primary component is tin may be used favorably for a surface conductor film 12b, 13b having a two-layer structure, or a film whose primary component is tin may be used favorably for a surface conductor film 12b, 13b having a single-layer structure. This means that, even when the surface conductor film 12b, 13b adopts a layer structure comprising any number of layers other than three, a mode where the insertion part 12b2, 13b2 of the surface conductor film 12b, 13b fills in each clearance CL can be achieved, regardless of the number of layers, so long as the aforementioned condition is satisfied.

Next, an example of how the multilayer ceramic capacitor 10 shown in FIGS. 1 to 4B is manufactured, or specifically an example of manufacturing method when the primary component of the capacitive element 11' excluding the internal electrode layers 11a1 and primary component of each supplementary dielectric layer 11d are both barium titanate, the primary component of each internal electrode layer 11a1, primary component of each first base conductor film 11c, and primary component of each second base conductor film 12a, 13a are all nickel, the primary component of the first film f1 of each surface conductor film 12b, 13b is copper, the primary component of the second film f2 is nickel, and the primary component of the third film f3 is tin, is explained using FIGS. 5 to 8 and also by quoting the symbols shown in FIGS. 1 to 4B. It should be noted that the manufacturing example explained here is only one example and does not limit in any way how the multilayer ceramic capacitor 10 is manufactured.

For the manufacture, first a ceramic slurry containing barium titanate powder, organic solvent, organic binder, dispersant, etc., a first electrode paste containing nickel powder, organic solvent, organic binder, dispersant, etc., and a second electrode paste containing nickel powder, barium titanate powder (co-material), organic solvent, organic binder, dispersant, etc., are prepared.

Next, the ceramic slurry is coated on the surfaces of carrier films and then dried, to produce first sheets. Also, the first electrode paste is printed on the surfaces of these first sheets and then dried, to produce second sheets on which matrix or zigzag-shaped, unsintered internal electrode layer patterns have been formed. Furthermore, the second electrode paste is printed on the surfaces of first sheets and then dried to form striped, unsintered first base conductor film patterns corresponding to the first base conductor films 11c, while the ceramic slurry is printed between the adjacent unsintered first base conductor film patterns in such a way that a clearance is provided between the slurry and each first base conductor film pattern, and then dried, to form striped, unsintered supplementary dielectric layer patterns corresponding to the supplementary dielectric layers 11d, and thereby produce third sheets on which the unsintered first base conductor film patterns and unsintered supplementary dielectric layer patterns have been formed.

Next, a specified number of unit sheets taken from the first sheets are stacked and thermally compressed one by one, to form an area corresponding to the dielectric margin part 11b in one height direction. Next, a specified number of unit sheets taken from the second sheets (including the unsintered internal electrode layer patterns) are stacked and thermally compressed one by one, to form an area corresponding to the capacitive part 11a. Next, a specified number of unit sheets taken from the first sheets are stacked and thermally compressed one by one, to form an area corresponding to the dielectric margin part 11b in the other height direction. Lastly, the entire sheets are thermally compressed together to produce an unsintered first multilayer sheet (refer to FIG. 5). It should be noted that, while the unsintered first multilayer sheet depicted in FIG. 5 corresponds to one multilayer ceramic capacitor 10 above for the convenience of illustration, the actual unsintered first multilayer sheet has a size that allows multiple multilayer ceramic capacitors to be taken from it.

Figure 6A:
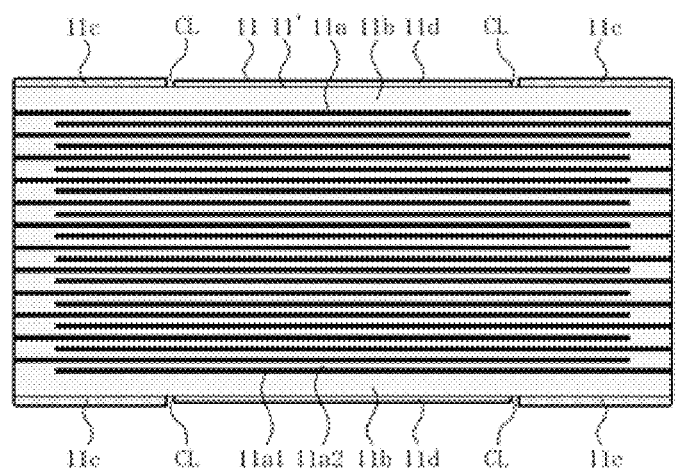
FIG. 6A and FIG. 6B are each a drawing explaining an example of how the multilayer ceramic capacitor shown in FIG. 1 is manufactured, where
Figure 6B:
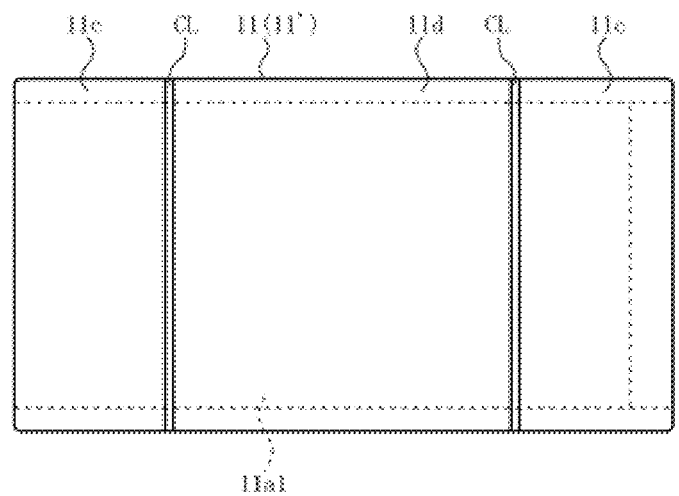

Next, third sheets are stacked on both height-direction faces of the unsintered first multilayer sheet and then thermally compressed, after which the entire sheets are thermally compressed together as necessary, to produce an unsintered second multilayer sheet (refer to FIGS. 6A and 6B). It should be noted that, while the unsintered second multilayer sheet depicted in FIGS. 6A and 6B corresponds to one multilayer ceramic capacitor 10 above, the actual unsintered second multilayer sheet has a size that allows multiple multilayer ceramic capacitors to be taken from it.

Next, the unsintered second multilayer sheet having a size that allows multiple multilayer ceramic capacitors to be taken from it, is cut into a grid, to produce unsintered capacitor bodies each corresponding to the capacitor body 11 (refer to FIGS. 6A and 6B). Next, the second electrode paste is applied on both length-direction faces of each unsintered capacitor body by dip-coating, roller-coating or other method, and then dried, to produce second base conductor films corresponding to the second base conductor films 12a, 13a (refer to FIG. 7).

Figure 7:
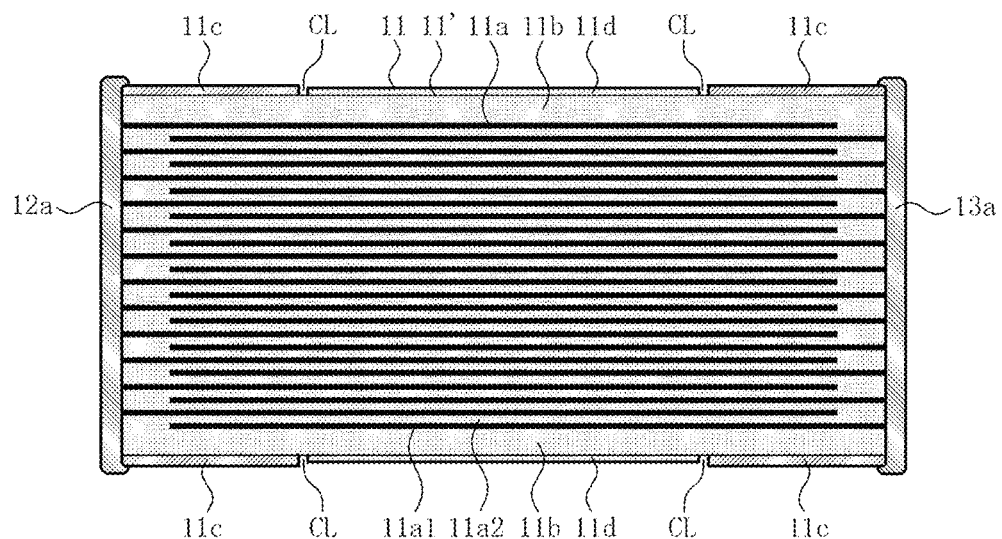
FIG. 7 is a drawing corresponding to FIG. 3, provided to explain an example of how the multilayer ceramic capacitor shown in FIG. 1 is manufactured.

Next, multiple unsintered capacitor bodies having unsintered second base conductor films are introduced to a sintering furnace and sintered (including binder removal and sintering) simultaneously in a reducing ambience based on a temperature profile appropriate for barium titanate and nickel, to produce capacitor bodies 11 having second base conductor films 12a, 13a (refer to FIG. 7).

Figure 8:
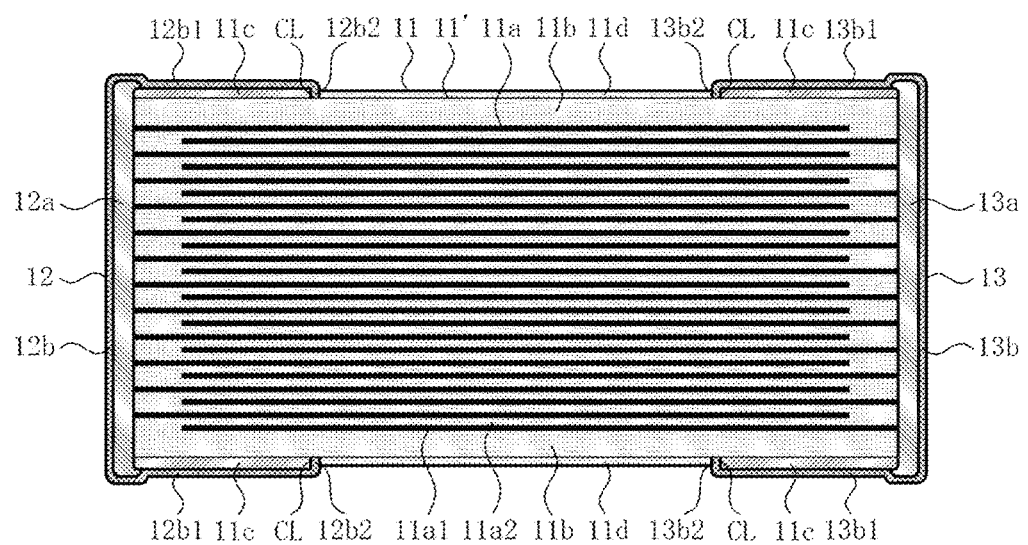
FIG. 8 is a drawing corresponding to FIG. 3, provided to explain an example of how the multilayer ceramic capacitor shown in FIG. 1 is manufactured.

Next, electroplating or other wet plating method is used to produce a first film f1 (whose primary component is copper) for the surface conductor film 12b, 13b, which is continuously attached to the surface of each second base conductor film 12a, 13a and also to the surface of each first base conductor film 11c (refer to FIGS. 8, 4A, and 4B). Next, electroplating or other wet plating method is used to produce a second film f2 (whose primary component is nickel) for the surface conductor film 12b, 13b, which is attached to the surface of the first film f1 (refer to FIGS. 8, 4A, and 4B). Next, electroplating or other wet plating method is used to produce a third film f3 (whose primary component is tin) for the surface conductor film 12b, 13b, which is attached to the surface of the second film f2 (refer to FIGS. 8, 4A, and 4B).

The capacitor body 11 with the second base conductor films 12a, 13a as shown in FIG. 7 has two clearances CL on each of both height-direction faces; in the process of producing the first films f1, second films f2, and third films f3 for the surface conductor films 12b, 13b, however, the respective clearances CL are gradually filled in by the apical ends of the respective films f1, f2, f3. As a result, a mode is achieved where each surface conductor film 12b, 13b has insertion parts 12b2, 13b2 that fill in the respective clearances CL (refer to FIGS. 4A and 4B).

It should be noted that the second base conductor films 12a, 13a may be produced in the steps of producing a capacitor body 11 by sintering the aforementioned unsintered capacitor body (refer to FIGS. 6A and 6B) in the same manner as mentioned above, and then applying on both length-direction faces of the capacitor body 11, and drying and baking, the second electrode paste.

Also, the primary component of the capacitive element 11' excluding the internal electrode layers 11a1 may be any dielectric material other than barium titanate, the primary component of each supplementary dielectric layer 11d may be any dielectric material other than barium titanate, the primary component of each internal electrode layer 11a1 may be any metal material other than nickel, the primary component of each first base conductor films 11c may be any metal material other than nickel, the primary component of each second base conductor film 12a, 13a may be any metal material other than nickel, the primary component of the first film f1 of each surface conductor film 12b, 13b may be any metal material other than copper, the primary component of the second film f2 may be any metal material other than nickel, and the primary component of the third film f3 may be any metal material other than tin, as mentioned earlier. In addition, each surface conductor film 12b, 13b may have any layer structure other than a three-layer structure, as mentioned earlier.

Next, the structure of another multilayer ceramic capacitor to which the present invention is applied, is explained using FIGS. 9 and 10.

The multilayer ceramic capacitor shown in FIG. 9 has a height H equal to one-half the height H of the multilayer ceramic capacitor 10 shown in FIGS. 1 to 4B. For reference, the actual dimensions of the length L, width W, and height H of the third prototype on which FIG. 9 is based are 600 μm, 300 μm, and 150 μm, respectively, while the actual dimensions of the length L, width W, and height H of the fourth prototype are 1000 μm, 500 μm, and 250 μm, respectively, and in both cases the dimensions have the relationship of "Length L>Width W>Height H." The values of height H indicated above (150 μm and 250 μm) are only examples, and so long as it is smaller than the width W of the multilayer ceramic capacitor 10, the value of height H is not limited in any way. It should be noted that, while the second base conductor films 12a, 13a of the external electrodes 12, 13 depicted in FIG. 9 have both of their height-direction edges slightly overlapping the first base conductor films 11c, as is the case with FIGS. 1 to 3, these overlapping parts may not be necessary or the overlapping parts may be slightly longer than as illustrated.

The multilayer ceramic capacitor shown in FIG. 10 is the same as the multilayer ceramic capacitor 10 shown in FIGS. 1 to 4B, except that the two first base conductor films 11c and supplementary dielectric layers 11d present on the other height-direction face (top face in FIG. 3) of the capacitor body 11 have been eliminated, and that, because of this elimination, the wraparound locations 12b1, 13b1 on the other height-direction face have also been eliminated from the surface conductor films 12b, 13b of the external electrodes 12, 13. In other words, the external electrodes 12, 13 of the multilayer ceramic capacitor shown in FIG. 10 each have one wraparound part that only wraps around onto one height-direction face (bottom face in FIG. 10) of the capacitor body 11 (corresponding to 12c and 13c; refer to FIGS. 1 to 4B). The mode of the external electrodes 12, 13 shown here may also be applied to the multilayer ceramic capacitor whose height H is smaller as explained using FIG. 9. It should be noted that, while the second base conductor films 12a, 13a of the external electrodes 12, 13 depicted in FIG. 10 have both of their height-direction edges slightly overlapping the first base conductor films 11c and the other height-direction face (top face in FIG. 9) of the capacitor body 11, as is the case with FIGS. 1 to 3, these overlapping parts may not be necessary or the overlapping parts may be slightly longer than as illustrated.

Also, while not illustrated, third base conductor films may be provided on both width-direction sides of the capacitor body 11 of the multilayer ceramic capacitor 10 shown in FIGS. 1 to 4B in a manner continuing to the first base conductor films 11c, and the surface conductor films 12b, 13b may be provided in a manner also attaching to the surfaces of these third base conductor films; this way, the external electrodes 12, 13 can be constituted so that each has a total of four wraparound parts including those that wrap around onto both width-direction faces, in addition to those that wrap around onto both height-direction faces, of the capacitor body 11.

Next, the effects achieved by the multilayer ceramic capacitor 10 shown in FIGS. 1 to 4B are explained. The effects explained here can also be achieved with the multilayer ceramic capacitors respectively shown in FIGS. 9 and 10, in the same manner.

[Effect 1] A structure is adopted wherein the spaces between the two first base conductor films 11c on both height-direction faces of the capacitor body 11 are respectively covered with the supplementary dielectric layers 11d in such a way that clearances CL are left between the first base conductor films 11c and the supplementary dielectric layers 11d in the length direction, while these clearances CL are filled in by the insertion parts 12b2, 13b2 of the surface conductor films 12b, 13b of the external electrodes 12, 13. In other words, length-direction clearances CL are actively provided between the two first base conductor films 11c and each first base conductor film 11c, and therefore the design to ensure as little clearance as possible, as mentioned in connection with the prior art, is not necessary. In addition, because the clearances CL are filled in by the insertion parts 12b2, 13b2 of the external electrodes 12, 13, entry of water into the capacitor body 11 through the clearances CL can be suppressed and the concern that moisture resistance of the capacitor body 11 may drop can be mitigated.

[Effect 2] Because the spaces between the wraparound parts 12c, 13c of the external electrodes 12, 13 on both height-direction faces of the capacitor body 11 are covered with the supplementary dielectric layers 11d, the strength of the capacitor body 11 can be supplemented by the supplementary dielectric layers 11d, even when the height H of the multilayer ceramic capacitor 10 is reduced.

[Effect 3] Because the thickness tb of each supplementary dielectric layer 11d is equal to or less than the thickness (corresponding to ta+td) of the wraparound part 12c, 13c of each external electrode 12, 13, the supplementary dielectric layers 11d do not become obstacles in the way of mounting the multilayer ceramic capacitor 10 on a circuit board or storing it in a component-embedded board.

[Effect 4] By setting the length La of the first base conductor film 11c constituting the wraparound part 12c, 13c of each external electrode 12, 13 in a range of one-sixth to three-sevenths the length L of the multilayer ceramic capacitor 10 according to the size of the multilayer ceramic capacitor 10, length Lb of the supplementary dielectric layer 11d, length Lc of the clearance CL, or the like, sufficient connection areas with the wraparound parts 12c, 13c of the external electrodes 12, 13 can be ensured when mounting the multilayer ceramic capacitor 10 on a circuit board or storing it in a component-embedded board.

[Effect 5] Because the thickness td of the surface conductor film 12b constituting the external electrode 12 and that of the surface conductor film 13b constituting the external electrode 13 are both equal to or greater than the length Lc of each clearance CL, and also because the surface conductor films 12b, 13b are each a plating film, each clearance CL can be filled in by the insertion part 12b2, 13b2 of each external electrode 12, 13 in a precise manner.

Next, the verification result of Effect 1 (effect relating to deterioration in moisture resistance) above is explained using FIG. 11 and also by quoting the symbols shown in FIGS. 1 to 4B.

The first prototype shown in FIG. 11 is a multilayer ceramic capacitor whose length L is 600 μm, width W is 300 μm, and height H is 300 μm, while the second prototype is a multilayer ceramic capacitor whose length L is 1000 μm, width W is 500 μm, and height H is 500 μm. The structure of the first prototype and that of the second prototype were explained earlier using FIGS. 1 to 4B.

Additionally, with the first prototype and also with the second prototype, the primary component of the capacitive element 11' excluding the internal electrode layers 11a1 and primary component of each supplementary dielectric layer 11d, are both barium titanate, the primary component of each internal electrode layer 11a1, primary component of each first base conductor film 11c, and primary component of each second base conductor film 12a, 13a are all nickel, and the primary component of the first film f1 of each surface conductor film 12b, 13b is copper, the primary component of the second film f2 is nickel, and the primary component of the third film f3 is tin, and both prototypes were manufactured according to the example of manufacturing method that was explained using FIGS. 5 to 8.

The specifications of the key parts of the first prototype are as follows: the length La of each first base conductor film 11c is 150 μm; the thickness to of each first base conductor film 11c is 5 μm; the thickness tb of each supplementary dielectric layer 11d is 5 μm; the thickness tc of each second base conductor film 12a, 13a is 10 μm; and the thickness td of each surface conductor film 12b, 13b is 5 μm. For the verification, 100 samples were prepared for the first prototype with each different length Lc of each clearance CL, achieved by changing the length Lb of each supplementary dielectric layer 11d (refer to FIG. 11).

The specifications of the key parts of the second prototype are as follows: the length La of each first base conductor film 11c is 250 μm; the thickness to of each first base conductor film 11c is 5 μm; the thickness tb of each supplementary dielectric layer 11d is 5 μm; the thickness tc of each second base conductor film 12a, 13a is 10 μm; and the thickness td of each surface conductor film 12b, 13b is 5 μm. For the verification, 100 samples were prepared for the second prototype with each different length Lc of each clearance CL, achieved by changing the length Lb of each supplementary dielectric layer 11d (refer to FIG. 11).

The "Moisture resistance test" columns in FIG. 11 shows the moisture resistance inspection results of the first prototype and second prototype samples. To be specific, 100 samples of each different prototype were exposed for 500 hours in an environment of 85° C. in temperature and 85% in humidity using a hydro-thermostatic chamber (PR-3J manufactured by Espec), and then the 100 samples of each different prototype were removed from the hydro-thermostatic chamber and left for 24 hours at room temperature, after which the 100 samples of each different prototype were measured for insulation resistance using a high-resistance meter (4329A manufactured by Agilent), and the number n of samples whose measured value was less than 500 MΩ (inferior moisture resistance samples) was indicated, in the format of n/100, for each length Lc of the clearance CL.

It is evident from the values in the "Moisture resistance test" columns in FIG. 11 that, with the first prototype samples, moisture resistance deteriorates when the length Lc of the clearance CL exceeds the thickness td (5 μm) of the surface conductor film 12b, 13b. Also, with the second prototype samples, moisture resistance deteriorates when the length Lc of the clearance CL exceeds the thickness td (5 μm) of the surface conductor film 12b, 13b.

Based on the above, the concern that moisture resistance may drop can be mitigated, not only with the first prototype and second prototype, but also with the other multilayer ceramic capacitor structures described earlier, so long as the length Lc of the clearance CL is set to the thickness td of the surface conductor film 12b, 13b or less, or to put it differently, so long as the thickness td of the surface conductor film 12b, 13b is set to the length Lc of the clearance CL or greater.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No., filed 2016-145123, Jul. 25, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A multilayer ceramic capacitor comprising a capacitor body of roughly rectangular solid shape, as well as a pair of external electrodes provided on both ends of the capacitor body in a length direction, where the external electrodes each have wraparound parts that wrap around onto at least a one height-direction face of the capacitor body, wherein:
    the capacitor body has: (a1) a capacitive element of roughly rectangular solid shape; (a2) first base conductor films provided on both length-direction ends of at least one height-direction face of the capacitive element; and (a3) a supplementary dielectric layer covering the space between the first base conductor films on the at least one height-direction face of the capacitive element except that there is a clearance between each of the first base conductor films and the supplementary dielectric layer in the length direction, wherein the supplementary dielectric layer is a ceramic;
    one of the external electrodes has: (b1) a second base conductor film attached to one length-direction face of the capacitive element and also to one length-direction edge of the first base conductor film present on the one length-direction side of the capacitor body; and (b2) a surface conductor film attached continuously to a surface of the second base conductor film and also to a surface of the first base conductor film, wherein the wraparound part is constituted by the first base conductor film and the surface conductor film attached to the first base conductor film at the wraparound location, and the surface conductor film has, at the wraparound location, an insertion part that fills in the clearance; and
    another of the external electrodes has: (c1) a second base conductor film attached to another length-direction face of the capacitive element and also to another length-direction edge of the first base conductor film present on the other length-direction side of the capacitor body; and (c2) a surface conductor film attached continuously to a surface of the second base conductor film and also to a surface of the first base conductor film, wherein the wraparound part is constituted by the first base conductor film and the surface conductor film attached to the first base conductor film at the wraparound location, and the surface conductor film has, at the wraparound location, an insertion part that fills in the clearance.

2. A multilayer ceramic capacitor according to claim 1, wherein a thickness of the supplementary dielectric layer is equal to or less than a thickness of the wraparound part of each of the external electrodes.

3. A multilayer ceramic capacitor according to claim 2, wherein a length of the first base conductor film is set in a range of one-sixth to three-sevenths a length of the multilayer ceramic capacitor.

4. A multilayer ceramic capacitor according to claim 3, wherein respective lengths of the surface conductor films are equal to or greater than respective lengths of the clearances.

5. A multilayer ceramic capacitor according to claim 2, wherein respective lengths of the surface conductor films are equal to or greater than respective lengths of the clearances.

6. A multilayer ceramic capacitor according to claim 2, wherein the surface conductor films are constituted by a plating film.

7. A multilayer ceramic capacitor according to claim 2, wherein the first base conductor films are provided on both height-direction faces of the capacitive element, and the external electrodes each have two wraparound parts that wrap around onto both height-direction faces of the capacitor body.

8. A multilayer ceramic capacitor according to claim 1, wherein a length of the first base conductor film is set in a range of one-sixth to three-sevenths a length of the multilayer ceramic capacitor.

9. A multilayer ceramic capacitor according to claim 8, wherein respective lengths of the surface conductor films are equal to or greater than respective lengths of the clearances.

10. A multilayer ceramic capacitor according to claim 8, wherein the surface conductor films are constituted by a plating film.

11. A multilayer ceramic capacitor according to claim 8, wherein the first base conductor films are provided on both height-direction faces of the capacitive element, and the external electrodes each have two wraparound parts that wrap around onto both height-direction faces of the capacitor body.

12. A multilayer ceramic capacitor according to claim 1, wherein respective lengths of the surface conductor films are equal to or greater than respective lengths of the clearances.

13. A multilayer ceramic capacitor according to claim 12, wherein the surface conductor films are constituted by a plating film.

14. A multilayer ceramic capacitor according to claim 12, wherein the first base conductor films are provided on both height-direction faces of the capacitive element, and the external electrodes each have two wraparound parts that wrap around onto both height-direction faces of the capacitor body.

15. A multilayer ceramic capacitor according to claim 1, wherein the surface conductor films are constituted by a plating film.

16. A multilayer ceramic capacitor according to claim 15, wherein the first base conductor films are provided on both height-direction faces of the capacitive element, and the external electrodes each have two wraparound parts that wrap around onto both height-direction faces of the capacitor body.

17. A multilayer ceramic capacitor according to claim 1, wherein the first base conductor films are provided on both height-direction faces of the capacitive element, and the external electrodes each have two wraparound parts that wrap around onto both height-direction faces of the capacitor body.

18. A multilayer ceramic capacitor according to claim 1, wherein the first base conductor films provided on both length-direction ends, and the supplementary dielectric layer are provided only on the height-direction face(s) of the capacitive element.

19. A multilayer ceramic capacitor comprising a capacitor body of roughly rectangular solid shape, as well as a pair of external electrodes provided on both ends of the capacitor body in a length direction, where the external electrodes each have wraparound parts that wrap around onto at least a one height-direction face of the capacitor body, wherein:
the capacitor body has: (a1) a capacitive element of roughly rectangular solid shape; (a2) first base conductor films provided on both length-direction ends of at least one height-direction face of the capacitive element; and (a3) a supplementary dielectric layer covering the space between the first base conductor films on the at least one height-direction face of the capacitive element except that there is a clearance between each of the first base conductor films and the supplementary dielectric layer in the length direction, wherein the first base conductor films provided on both length-direction ends, and the supplementary dielectric layer are provided only on the height-direction face(s) of the capacitive element;
one of the external electrodes has: (b1) a second base conductor film attached to one length-direction face of the capacitive element and also to one length-direction edge of the first base conductor film present on the one length-direction side of the capacitor body; and (b2) a surface conductor film attached continuously to a surface of the second base conductor film and also to a surface of the first base conductor film, wherein the wraparound part is constituted by the first base conductor film and the surface conductor film attached to the first base conductor film at the wraparound location, and the surface conductor film has, at the wraparound location, an insertion part that fills in the clearance; and
another of the external electrodes has: (c1) a second base conductor film attached to another length-direction face of the capacitive element and also to another length-direction edge of the first base conductor film present on the other length-direction side of the capacitor body; and (c2) a surface conductor film attached continuously to a surface of the second base conductor film and also to a surface of the first base conductor film, wherein the wraparound part is constituted by the first base conductor film and the surface conductor film attached to the first base conductor film at the wraparound location, and the surface conductor film has, at the wraparound location, an insertion part that fills in the clearance.

* * * * *